United States Patent [19]
Ricketts

[11] Patent Number: 5,979,364
[45] Date of Patent: Nov. 9, 1999

[54] MODULAR SHIPPING CRATE SYSTEM

[75] Inventor: Tod A. Ricketts, El Paso, Tex.

[73] Assignee: Animal Restraint Company, El Paso, Tex.

[21] Appl. No.: 08/826,905

[22] Filed: Apr. 9, 1997

[51] Int. Cl.[6] .................................................. A01K 1/00
[52] U.S. Cl. ......................................... 119/496; 52/591.1
[58] Field of Search ................................. 119/453, 496, 119/497, 498, 501; 446/110, 114; 52/591.1, 592.2

[56] References Cited

U.S. PATENT DOCUMENTS

| | | | |
|---|---|---|---|
| 3,890,932 | 6/1975 | Sanzone et al. | 119/498 |
| 4,807,808 | 2/1989 | Reed | 119/498 X |
| 5,645,014 | 7/1997 | Chilcote | 119/498 |

FOREIGN PATENT DOCUMENTS 2240024  7/1991  United Kingdom .................. 119/498

*Primary Examiner*—Robert P. Swiatek
*Attorney, Agent, or Firm*—Arnold White & Durkee

[57] ABSTRACT

A modular animal transportation crate includes a plurality of panels that form the floor, walls, doors and ceiling of the crate. The panels are connected to each other by panel and section connectors. The panels may include perforations which protrude away from the animal. The perforations provide ventilation through side and top when used as walls or ceilings and assist in the removal of waste products when serving as the floor. The inventive crate is preferably made of a strong lightweight material that is easily assembled, disassembled and re-assembled. The crate may also be used to transport animals and to house the animals at remote locations.

10 Claims, 9 Drawing Sheets

MODULAR SHIPPING CRATE SYSTEM

FIELD OF THE INVENTION

This invention relates to a modular animal shipping crate. More particularly, the invention relates to an environmentally controlled modular shipping crate of variable size that may be assembled, disassembled and reassembled for repeated use.

BACKGROUND OF THE INVENTION

For centuries, animals have been transported across continents and oceans, in ships and more recently, animals have been flown in airplanes from the wild to zoos. In fact, zoological and research institutions ship thousands of animals every, year. These shipments include, for example, inter-facility transfers, intra-institution shipments and transport from wildcatch staging areas to quarantine facilities.

There are no specific design standards for crate construction. However, some general guidelines exist for volume, ventilation and access requirements. For example, the 1945–1995 IATA Live Animals Regulations sets forth crate designs for various animals.

Transport crates are typically designed for the size and type of animals to be transported. Many institutions have significant inventories of crates for the numerous types and sizes of animals they maintain. Additional design factors, such as the temperament of the animal, its strength and the amount of husbandry required in transit, add to the number of different crates that an institution may hold.

These transport crates are typically built by the institution or contracted to local fabrication shops. Such crates take up a significant volume of cargo space whether an animal is being transported or the crate is being returned because they are typically not easily disassembled and reassembled. High-strength crates of conventional material and construction are typically very heavy so that they limit the weight-carrying capacity of the vehicle. Animals have also been and are being shipped in crates specifically made for that particular transport. In such instances, the crates are discarded after the one-time use.

The crates are typically made of wood and wire mesh. Rough surfaces and openings in the walls, floors, and ceilings of such crates can create a hazard for abrasions, lacerations and fractures. It is also difficult to properly ventilate, clean and care for the animals in such crates. Moreover, wood is porous and absorbs liquids which provides a breeding ground for bacteria and makes wood difficult to sterilize. Accordingly, wood crates create a significant number of potential problems.

Many animals will ingest the wooden crate material during the transport process. Even animals which would not generally attempt to chew and eat wood, will sometimes do so in a heightened stress state during transport.

Wood's low strength-to-weight ratio limits its use with large and/or strong animals. If wood is utilized for such crates it often must be very heavily reinforced in order to withstand the impact loads generated by the animals. Furthermore, building a crate in a permanent, non-disassembling configuration further inhibits proper cleaning and sterilization.

Use of crates, particularly with larger species and hoofed mammals, routinely requires a crate-training or habituation as part of the process. Prior to shipping, the crate must be in the animal's enclosure for extended periods while the animal is being acclimated to it. During this period, the crate is further exposed to potential abuse from the animal, increased exposure to waste materials, water, cleaning solutions and other environmental factors further limit the crate life.

Accordingly, the life-span of wooden crates is inherently short. Often the crate must be discarded after a few uses because the animal and the handling of the crate itself, have literally destroyed it.

Most institutions will not ship animals during the middle of summer or the middle of winter, because the temperature limits the shipment of animals in non-environmentally controlled enclosures. This effectively reduces the available shipping time by 120–150 days per year.

Accordingly, the need exists for a light-weight modular, reusable shipping crate for animals. There is also a need for shipping crates which reduce the chance of injury to the animal. The control of communicable disease, especially between separate facilities is very important in today's modern zoological institution. Finally, there is a need to properly ventilate, clean and handle such crates while in transport.

SUMMARY OF THE INVENTION

The present invention comprises a modularly constructed crate. The crate includes a floor, a ceiling disposed above the floor, and three walls and a door disposed between the ceiling and the floor.

The floor, ceiling, walls and door (collectively sections) each include at least one panel. Each panel preferably includes a base and two flanges disposed on opposite ends. A side is disposed on each panel between the flanges and along the base.

Panels are connected by a connection system. The interconnection of the panels is facilitated through the preferred innovative cross-sectional shape of the aluminum extrusions which form two sides of each panel. The panels that are disposed in the same plane may be connected by the sides and bar connectors or on the flange ends by fasteners. The panels that are disposed perpendicular to each other (other than those adjacent with the doors) are connected by corners.

The floor sections include a transport system. The transport system may include skids that are disposed on opposite sides of the panels. The transport system may also include rollers. castners or wheels. The floor also includes a waste collection system. Preferably the waste collection system includes panels having sufficient apertures to allow the waste to collect in removable pans disposed below the floor section panels.

The door sections are connected to wall sections by tracks. The tracks permit the doors to move with respect to the wall. A stop is disposed between the door and the floor to hold the door from falling below the floor.

This system limits or possibly eliminates the need to build an inventory of crates. Instead, an inventory of components can be maintained so that virtually any size shipping crate can be quickly and easily assembled for the particular need of the animal being transported. This allows the crate to be specifically tailored to the exact needs of the animal being shipped.

Because of the flexibility of the system, better material can be cost justified by the institution. When the number of different crate combinations is factored in, this system may be less expensive than having an inventory of lower quality transport crates.

The present crate system is easy to assembly, disassemble, and reassemble. The components are made in standard sizes and materials. The size of the crate can be varied based on the type of the animal by the configuration and number of panels used on the various sections of the crate. The crates can also be prepared or customized because the panels can be configured and assembled in numerous ways depending on the particular animal being transported. Finally, the crate is easily disassembled so that when the crate is being returned, it takes up less cargo space.

The assembled crates have a section modulus that maintain the rigidity and structural integrity of the crate and resists the force applied by the animal. The connector bars used to join the panels can provide a continuous connection for improved strength. The high strength characteristics of the modular crate is especially important when shipping potentially dangerous species such as large cats, bears, wild canines, primates and large hoofstock.

The inventive crate is designed and assembled to be free of sharp edges so there is are less opportunities where the animal can scrape or abrade itself and free of pinch points where an animal's extremities could become caught or mashed. The ventilation holes are recessed in the sheet dimples. This further increases the safety of the enclosure by limiting the animal's contact with the edges of the perforations.

The present crates are easy to clean because of the materials used, access panels and because the crate can be broken down into component parts. The size and configuration of the component panels allows them to be thoroughly disinfected. The preferred materials include stainless steel and aluminum which are easy to clean, disinfect and sterilize.

The way in which the connector system interlocks the panels help provide leak resistant connection. This is important to decrease the risk of disease transfer to other animals and to humans.

The inventive system also makes caring for the animal in transport easy. The crate includes access panels for viewing, feeding, cleaning and attending to the animal's needs. Furthermore, the animal can be observed and treated without having to open the doors through the various walls.

Cleanliness is important not only for the animal's well-being, but to limit the possibility of transferring disease from one institution to another. Diseases can devastate an institution's animals especially if there is no known vaccine or cure. In the case of endangered species held in zoos, epidemics can potentially eliminate an entire species.

The crates can be modified for particular needs of animals. For instance, panels can be modified to include access panels or the metal may be changed to Lexan panels which would allow viewing of the animal through a shatter-resistant window. Panels with automatic feeders and watering troughs are also options which can be incorporated.

To improve the safety of shipping during warm conditions, panels with integral misting systems and panels with battery operated cooling fans for moving higher volumes of air are potential options. To warm the animal during cold weather, panels with integral battery operated heaters can be provided.

Improved mobility of the crate is also provided. In addition to fork-truck access from the ends of the crate, skids can be attached to the bottom of the crate so that it can be lifted from the side. A lifting eye can be easily attached to the top of the crate for suspended lifting. Rolling transport may also be incorporated by wheels or casters or the like.

The advantages and aspects of the invention discussed above are illustrative of this inventive crate. Other advantages and favorable aspects of this system will be understood by those of ordinary skill in the art especially when reviewing the detailed description in view of the drawings.

PREFERRED EMBODIMENT

Figure 1:
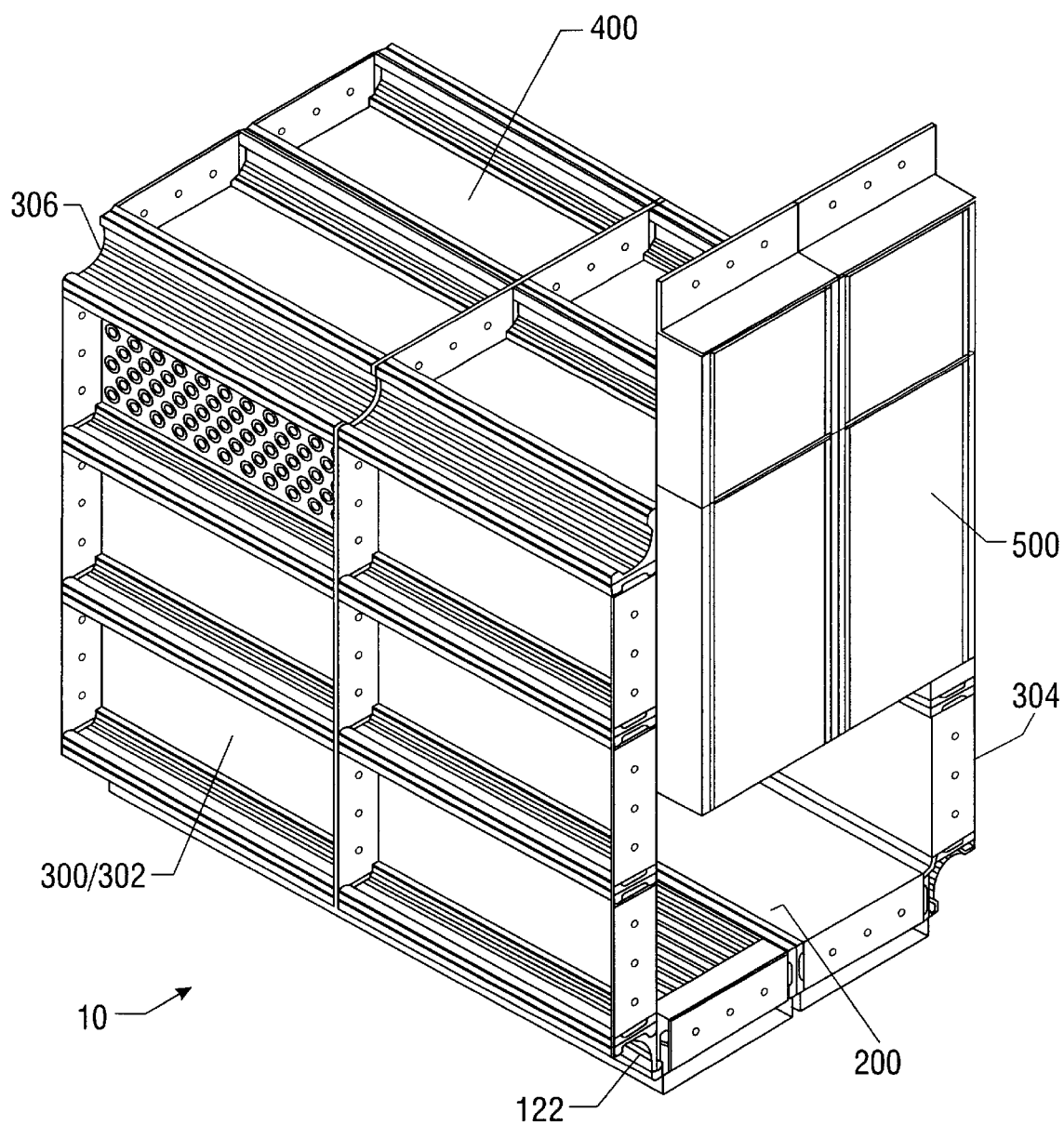
FIG. 1 is a perspective view of the inventive modular crate system.

The preferred configuration of the inventive modular animal crate 10 is shown in FIG. 1. The crate 10 comprises a floor section 200, a least one wall section 300 disposed above the floor section 200, a ceiling section 400 disposed above wall sections 300, and at least one door section 500 disposed between the ceiling section 400 and the floor section 200.

Panels

Figure 2:
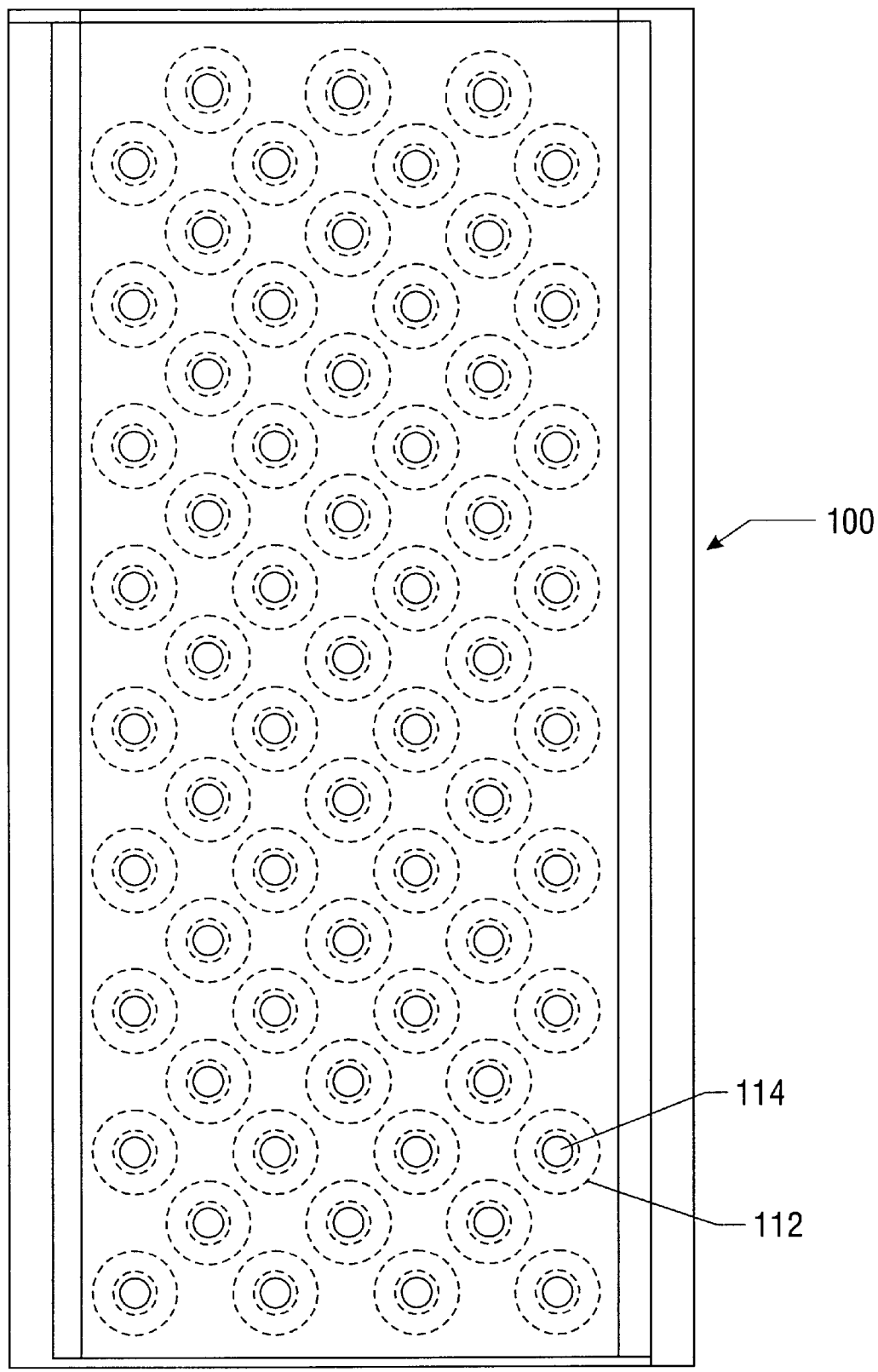
FIG. 2 is a top view of a preferred modular panel.
Figure 3:
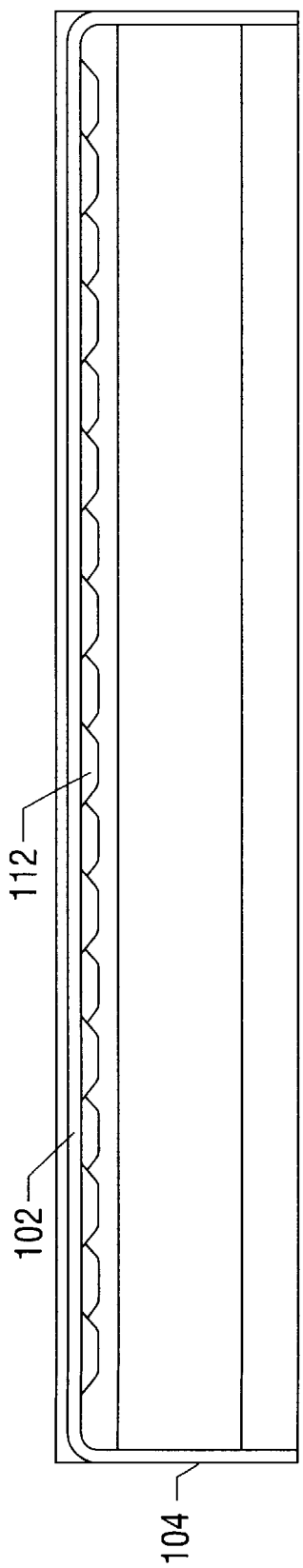
FIG. 3 is a side view of a preferred modular panel.
Figure 4:
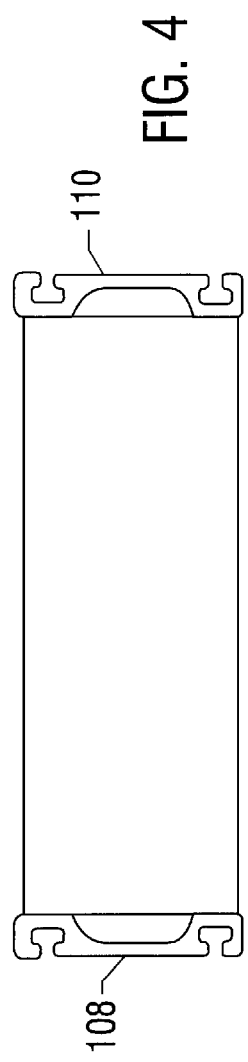
FIG. 4 is a bottom view of a preferred modular panel.

FIGS. 2–7 illustrate the preferred panel 100. Each floor, wall, ceiling and door section comprise at least one panel 100. Each preferred panel 100 comprises a base 102 having two flanged ends 104 and 106, and two sides 108 and 110. Preferably, the base 102 includes dimples 112. The dimples 112 are preferably arranged as shown in FIG. 2. In most applications, the dimples preferably also include apertures 114.

The sides 108 and 110 are disposed along the base 102 between the ends of the two flanges 104 and 106. The sides 108 and 110 include channels 116 and 118. The sides 108 and 110 may be connected to the base 102 and flanges 104 and 106 by fasteners, welding, glueing or any other appropriate means.

The channels 116 and 118 are adapted to receive bars 120. Bars 120 are adapted to connect the side (e.g., 108) of one panel to the side (e.g. 110) of another panel when the panels 100 are disposed in the same plane. Channels may also be disposed on the flanged ends 104/106 of the panels 100.

The sides 108 and 110 and flanges that include channels are also adapted to receive corners 122. Corners 122 are adapted to connect panels 100 that are disposed perpendicular to one another. Corners 122 also include channels 124, 126 and 128 and preferred corners also include a half-bar 130. The channels are adapted to accept bars 120. The half-bar 130 is adapted to be received in any channel.

Floor Section 200

The preferred floor section is shown in FIGS. 8–11. The preferred floor 200 comprises four panels 202 disposed in the same plane, pans 204 disposed underneath each panel, and skids 206, disposed beneath and along the flanged ends of panels 202. Panels 202 are adapted to serve as a floor of the crate and adapted to permit solid and liquid waste material to fall through the floor 200 and into the pans 204.

The pans 204 are adapted to accept the waste material. The panel and pan combinations are also adapted to accept fluids used to wash, disinfect or otherwise clean the interior of the crate. The pans preferably include drains 208 that are adapted to remove the waste material and cleaning fluids from the crated area.

Wall Section 300

The preferred crate 10 includes three wall sections 302, 304 and 306. Wall sections 302 and 304 are disposed opposite and parallel to each other and each include three panels. Wall section 306 is disposed perpendicular to wall sections 302 and 304 and is disposed parallel to door section 500. Wall section 306 preferably includes two panels.

The panels of wall section 302, 304 and 306 are connected to floor section 100 by corners 122. The preferred panels include the dimpled arrangement and aperture shown in FIG. 2. Each wall section may include one or more access door. The preferred panels may also include one or more window of transparent material such as Lexan or glass so that the animal can be viewed without having to open an access doors or the doors, section 500.

Ceiling Section 400

The preferred ceiling section 400 is shown in FIG. 1. The preferred ceiling section 400 includes panels 402, 404, 406, and 408. The preferred panels 402–408 are dimpled but do not include apertures. They may also include one or more access panel and one or more window.

Door Section 500

Figure 12:
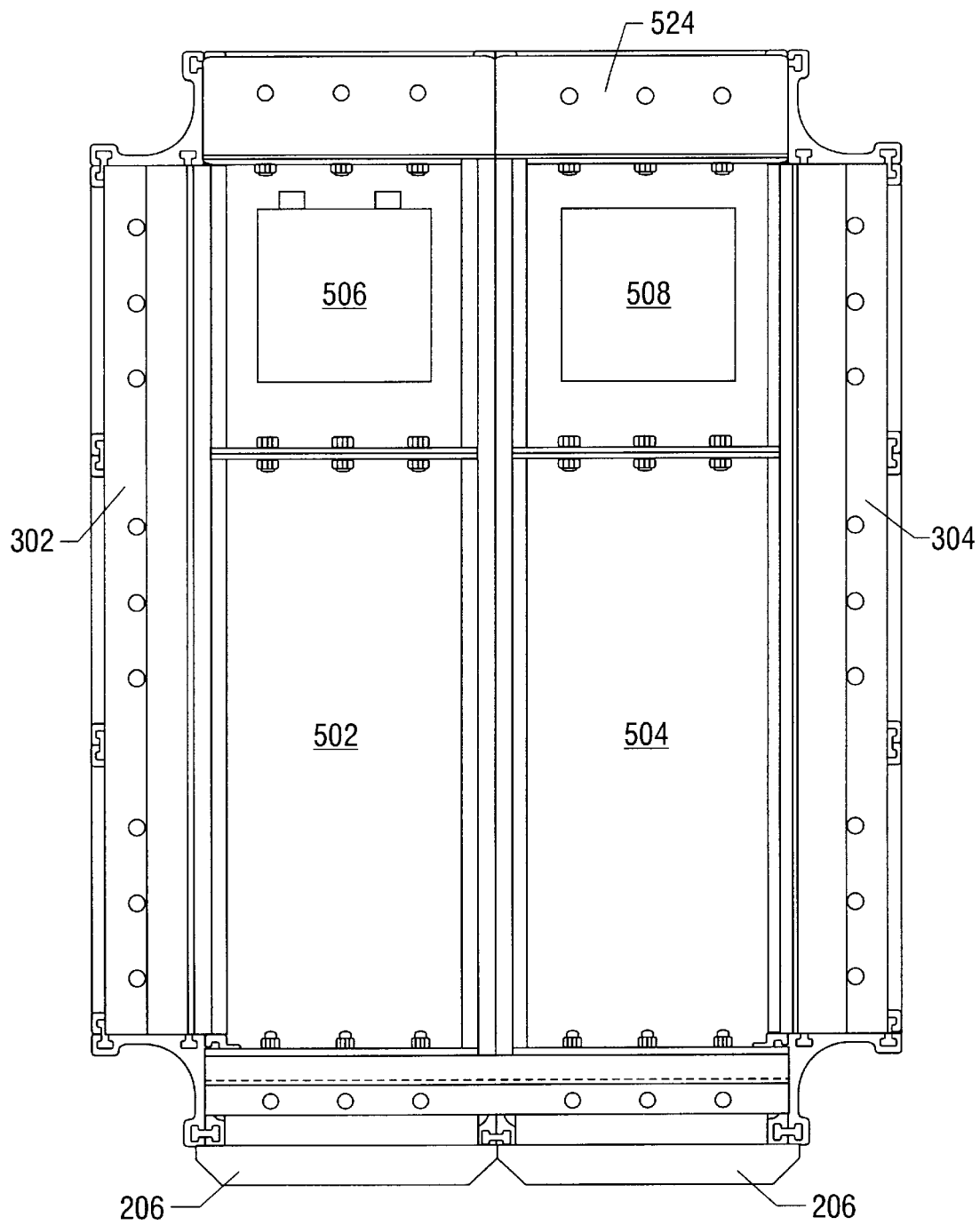
FIG. 12 is a front view of the door section.
Figure 14:
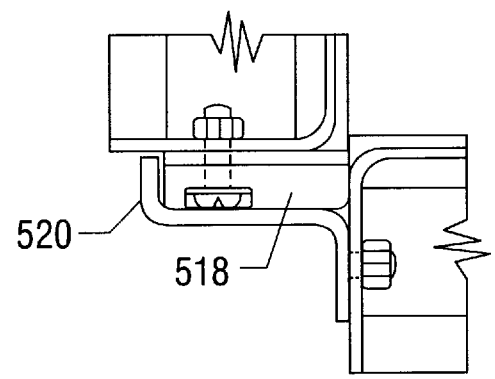
FIG. 14 is a side view of the door section stop.

The preferred door section 500 and its components are shown in FIGS. 12 and 14.

The preferred door section 500 includes two panels 502 and 504 disposed parallel to each other. The panels 502 and 504 preferably include one or more access panels 506 and one or more windows 508. The preferred door 500 includes a dimpled arrangement with apertures as shown in FIG. 2.

The preferred door system 500 is disposed in sliding relation with respect to the two adjacent walls 302 and 304. Slides 510 and 512 are disposed on the outside of door panels 502 and 504. The slides 510 and 512 typically include an HDPE nose section shown in FIG. 13. The slides 510 and 512 may also include rollers or other means that promote or permit the door section 500 to slide or move with respect to its adjacent walls 302 and 304.

Figure 13:
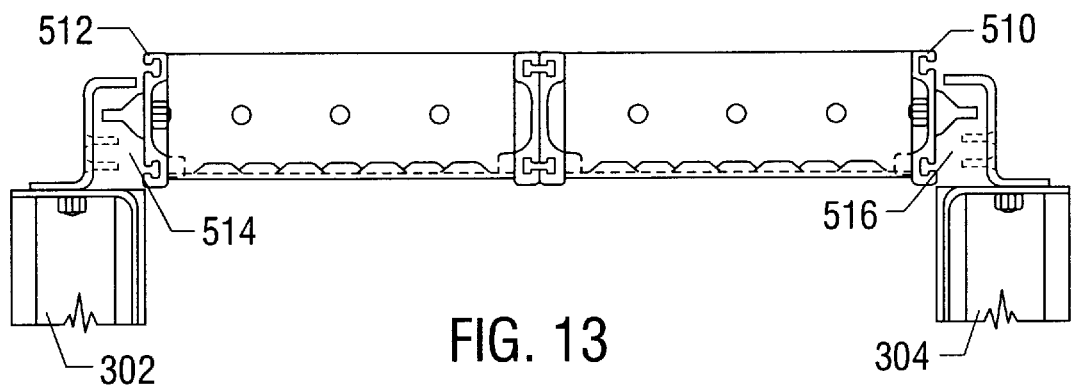
FIG. 13 is a top view of the door section.

Disposed on the sides of the walls 302 and 304 adjacent the door system 500 are tracks 514 and 516. The tracks 514 and 516 are adapted to receive the slides 510 and is 512, and are shown in FIG. 13. The tracks are preferably made of an HDPE material.

A bumper 518 is disposed along the bottom edge of the door system 500. A z-channel 520 is disposed along the floor section 200 disposed below the door section 500. The z-channel 520 is adapted to receive and retain the bumper 518 of the door section 500.

The preferred door system 500 is operated by lifting the two handles 522 and 524. The door section 500 may be more easily lifted by standing on top of the ceiling section 400 and lifting the handles 522 and 524 upward. The door system 500 also may be operated by other systems including but not limited to mechanically, electromechanically, or hydraulically actuated systems. The door system 500 may also be remotely controlled by various mechanical, electromechanical, electronic or hydraulic systems.

Other door systems such as hinged doors, tailgate type doors or double doors may also be used. Furthermore, the portion of the door section that actually opens and closes may also be only a part of the door section.

Environmental System 600

An environmental control system 600 is also preferred. The environmental control systems 600 are intended to permit transfer of animals during any seasons of the year. The environmental systems 600 may include a temperature control system 602. The temperature control system 602 is preferably disposed in one or more panels in the wall sections of the crate. The preferred environmental system 600 also includes a moisture control system 604. The preferred moisture control 604 includes one or more mister disposed on the ceiling in the interior of the crate.

Care System 700

The preferred crate 10 also includes care systems 700. The preferred care system 700 includes an automatic feeding system 702 that is preferably disposed in the interior of the crate near the door system 500. The preferred care system 700 also includes automatic watering troughs 704 disposed on the interior of the crate 10.

The preferred care system 700 also includes a cleaning system 706. This system 706 incorporates the moisture control system 604 to wash down not only the animal but also the ceiling 400, walls 300 and floor 200 sections of the crate 10. The dimpled panels having apertures in the floor and the pans used in the floor section 200 are also incorporated into the cleaning system.

Materials

The component parts and this inventive crate system 10 may be made to virtually any dimension or size. The preferred panels are 24 inches long, 10.5 inches wide, and .19 inches in width. The preferred dimple pattern is shown in FIG. 2 where the centers are 1.25 inches apart.

The preferred material is aluminum. However, stainless steel or other non-porous materials are also preferred. Wood and other porous materials, although not preferred, may also be incorporated.

Conclusion

The description of the preferred embodiment of the invention is intended to show those of skill in the art how to make and use the invention. It is also intended to provide the best way the inventor knows as of the date of filing this application of practicing the invention. Variations and modifications to this system may be made without in any way deviating from the spirit and intent of the invention.

What is claimed is:

1. A crate system comprising:
    a. a floor including at least one panel;
    b. a ceiling including at least one panel that is disposed above the floor;
    c. at least one wall including at least one panel that is disposed between the floor and the ceiling;
    d. at least one door including at least one panel that is disposed between the floor and the ceiling;

e. each panel comprising a base, two flanged ends disposed at opposite ends of the base, and two sides disposed opposite each other on the non-flanged ends of the base;

f. each side is adapted to connect to another side or to a corner; and g. a plurality of corners adapted to connect adjacent panels that are disposed perpendicular to each other.

2. A crate system, according to claim 1, where:

a. each side includes at least one channel;

b. each corner includes at least two channels; and c. a plurality of bars adapted to be received into two adjacent channels.

3. A crate system, according to claim 1, where a track is disposed between each door and the adjacent walls adapted to connect the door in sliding relation to the adjacent walls.

4. A crate system, according to claim 1, where the base of at least one panel includes apertures.

5. A crate system, according to claim 1, where at least one panel includes an access panel.

6. A crate system, according to claim 1, where the floor section comprises:

a. at least one skid disposed beneath at least one floor panel b. apertures disposed on in at least one floor panel; and c. pan disposed underneath the apertures.

7. A crate system, according to claim 1, further including a temperature control system.

8. A crate system, according to claim 1, further including a moisture control system.

9. A crate system, according to claim 1, further including a feeding system.

10. A crate system, according to claim 1, further including a watering system.

* * * * *

UNITED STATES PATENT AND TRADEMARK OFFICE
CERTIFICATE OF CORRECTION

PATENT : 5,979,364
DATED : November 9, 1999
INVENTOR(S): Tod A. Ricketts

It is certified that error appears in the above-identified patent and that said Letters Patent is hereby corrected as shown below:

Claim 6, column 8, line 5-6, delete "a. at least one skid disposed beneath at least one floor panel" and insert -- a. at least one skid disposed beneath at least one floor panel; --

Figure 5:
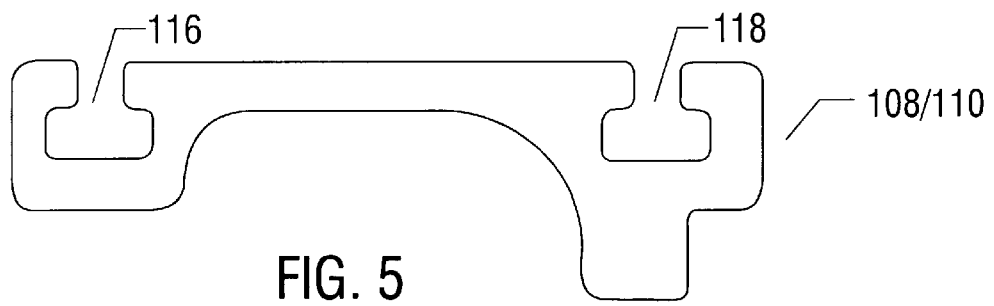
FIG. 5 is a crossectional view of a side.
Figure 6:
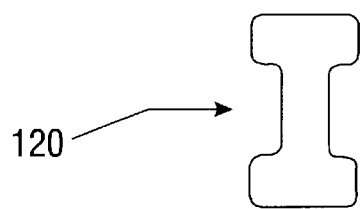
FIG. 6 is a crossectional view of a bar.
Figure 7:
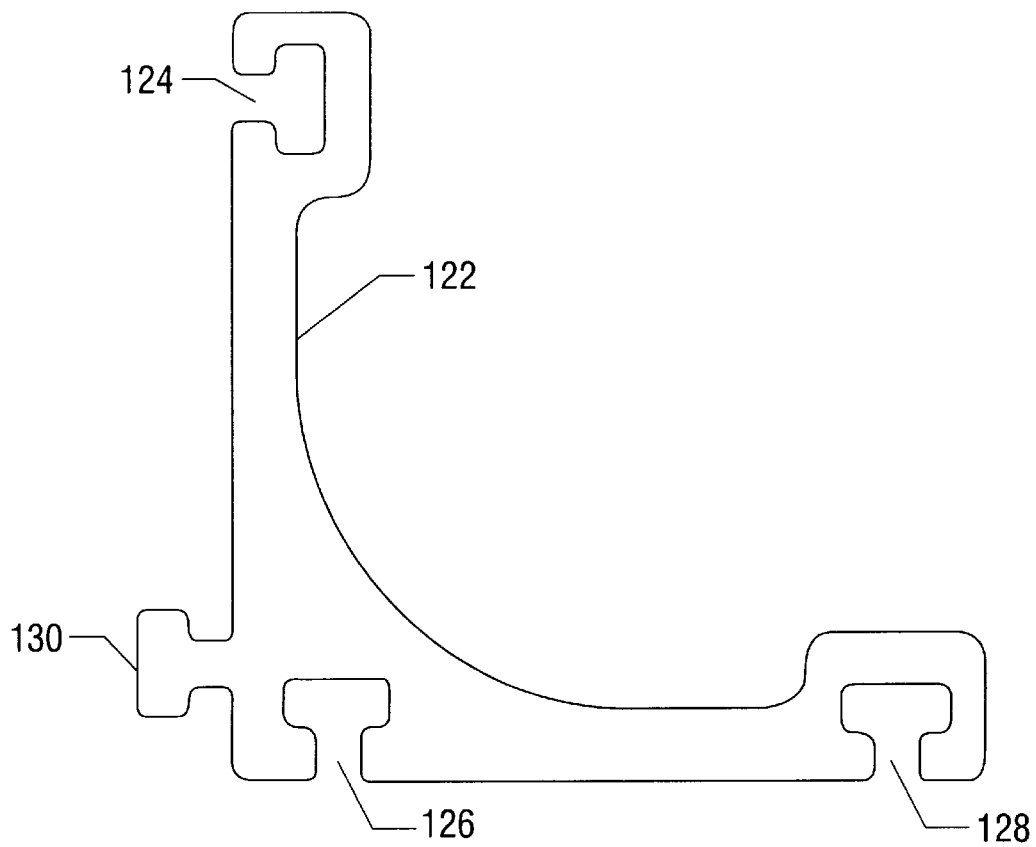
FIG. 7 is a crossectional view of a corner.
Figure 8:
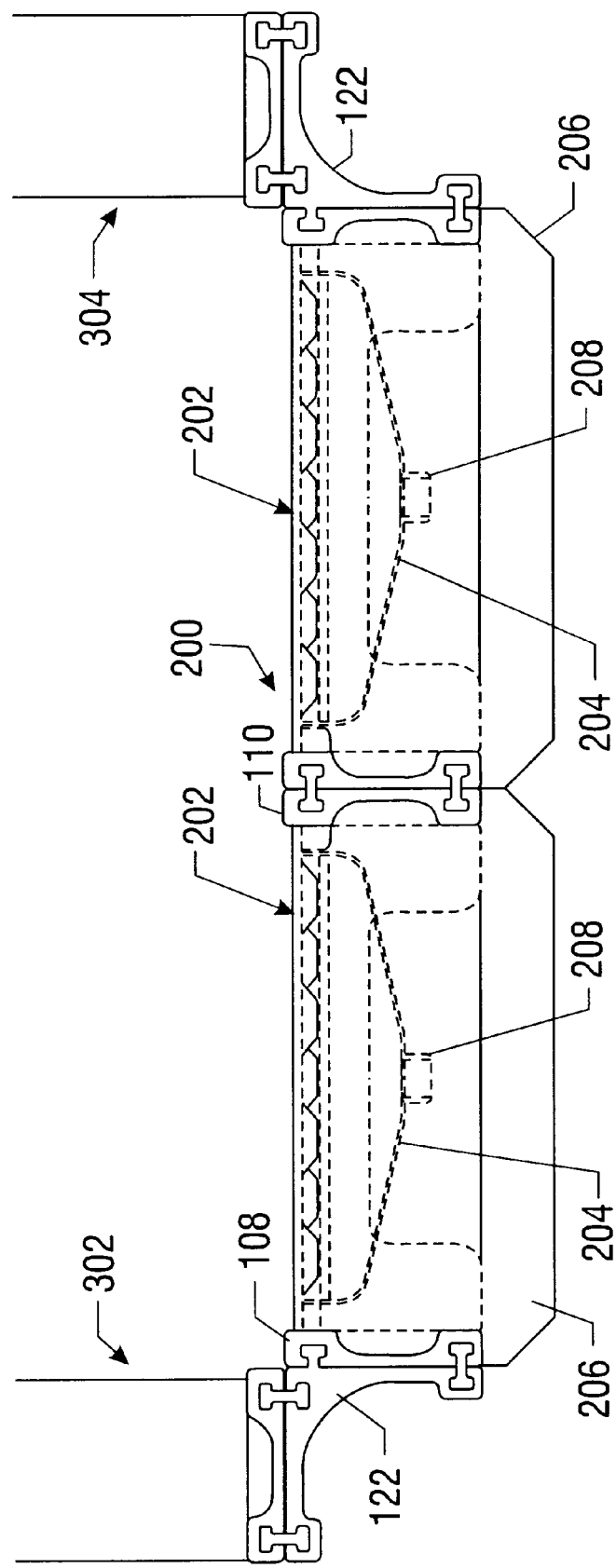
FIG. 8 is a side view of the floor section.
Figure 9:
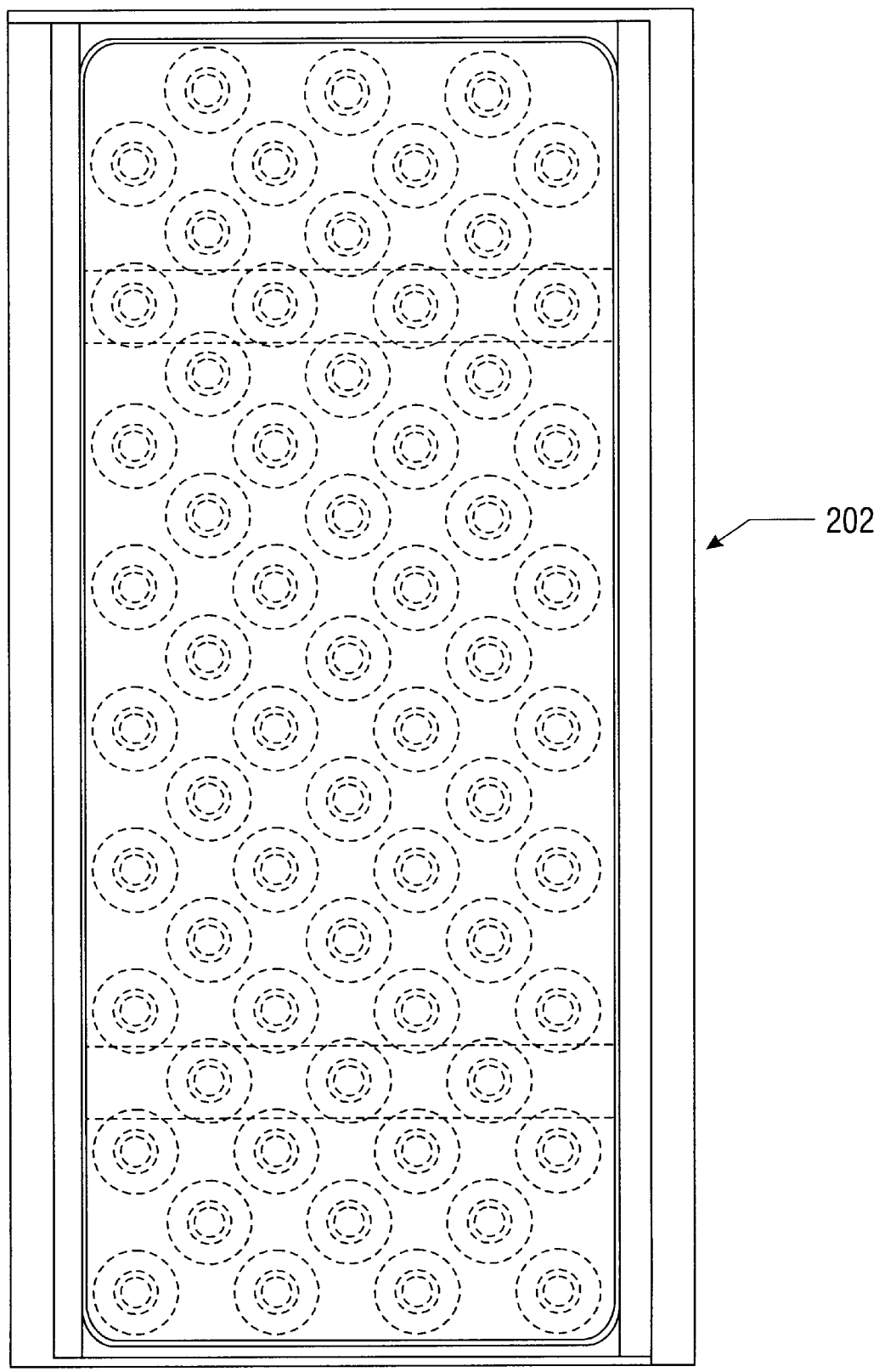
FIG. 9 is a top view of the floor panel.
Figure 10:
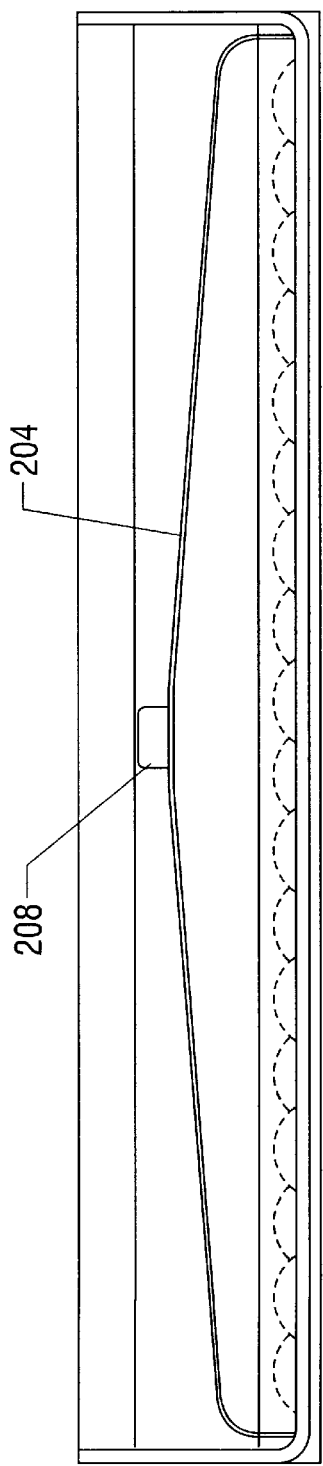
FIG. 10 is a side view of the floor panel.
Figure 11:
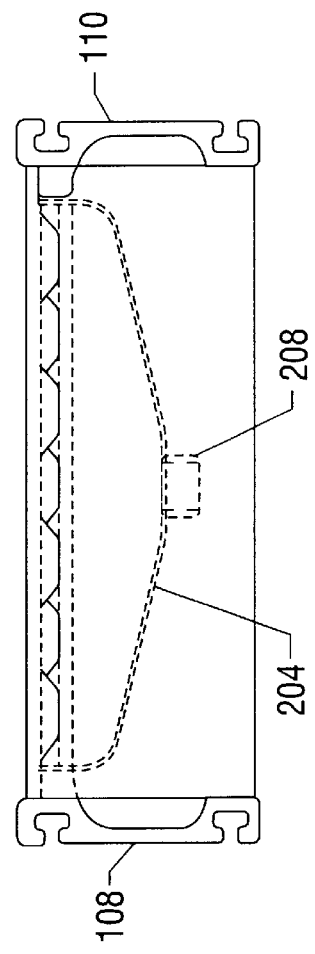
FIG. 11 is a bottom view of the floor panel.

In The Drawings:
Figure 5, remove reference to "110"
Figure 1, remover reference to "302"

Signed and Sealed this

Third Day of April, 2001

*Attest:*

NICHOLAS P. GODICI

*Attesting Officer*     *Acting Director of the United States Patent and Trademark Office*